United States Patent [19]
Macher

[11] 3,912,373
[45] Oct. 14, 1975

[54] HIGH-SPEED VARIFOCAL OBJECTIVE WITH LARGE FOCAL RANGE

[75] Inventor: Karl Macher, Bad Kreuznach, Germany

[73] Assignee: Jos. Schneider & Co. Optische Werke, Bad Kreuznach, Germany

[22] Filed: Sept. 12, 1973

[21] Appl. No.: 396,427

[30] Foreign Application Priority Data
Sept. 14, 1972 Germany............................ 2245105

[52] U.S. Cl. ................ 350/184; 350/185; 350/207
[51] Int. Cl.² ..................... G02B 15/02; G02B 9/64
[58] Field of Search ............ 350/184, 185, 186, 207

[56] References Cited
UNITED STATES PATENTS

| | | | |
|---|---|---|---|
| 3,152,211 | 10/1964 | Cox et al. .......................... | 350/184 |
| 3,346,320 | 10/1967 | Macher.............................. | 350/184 |
| 3,549,235 | 12/1970 | Macher.............................. | 350/184 |

Primary Examiner—Paul A. Sacher
Attorney, Agent, or Firm—Karl F. Ross; Herbert Dubno

[57] ABSTRACT

An objective with a varifocal ratio of up to 30:1 consists of seven components, i.e., a fixed positive front component, a movable negative second component, a movable negative third component, a fixed positive fourth component, a movable negative fifth component, a movable negative sixth component and a fixed positive seventh component. A lens-shifting mechanism serves to displace the second and third components in a first part of the varifocal range, between a minimum and an intermediate overall focal length, and to displace the fifth and sixth components in a second part of that range, between this intermediate and a maximum focal length. A diaphragm, inserted between the third and fifth components adjacent or within the fourth component, is so coupled with that mechanism that its opening increases in direct proportion to the overall focal length in the second part of the range.

11 Claims, 6 Drawing Figures

3,912,373

HIGH-SPEED VARIFOCAL OBJECTIVE WITH LARGE FOCAL RANGE

FIELD OF THE INVENTION

My present invention relates to a varifocal objective for taking or reproducing pictures in photography, cinematography or television.

BACKGROUND OF THE INVENTION

Varifocal objectives are known in which two components, usually of negative refractivity, are independently axially shiftable with reference to at least two other relatively stationary components (usually of positive refractivity) to alter the overall focal length of the objective while maintaining a fixed image plane, i.e., an invariable back-focal length as measured from the last vertex of the rearmost stationary component. The displacement of the shiftable components is correlated through the use of a common drive mechanism, such as a rotatable cylinder provided with respective camming slots for the guidance of these components.

Conventional systems of this character have been designed for varifocal rations $f_{max} : f_{min}$ of up to about 15 : 1; higher ratios are difficult to realize, especially in the case of a high-speed objective with large relative aperture, if oversize lenses and excessive optical aberrations are to be avoided.

OBJECTS OF THE INVENTION

The general object of my present invention, therefore, is to provide an improved high-speed objective with an extended varifocal range over which the objective is continuously adjustable without the need for any separate optical attachments serving as range extenders.

Another object is to provide means in such an objective for maintaining a substantially constant relative aperture throughout the varifocal range while using a front lens of only moderate diameter.

SUMMARY OF THE INVENTION

In accordance with my present invention, I provide a seven-component objective including a substantially fixed first component preferably of positive refractivity, axially shiftable second and third components preferably of negative refractivity, a fixed and preferably positive fourth component, axially shiftable and preferably negative fifth and sixth components, and a fixed and preferably positive seventh component. An adjusting mechanism coupled with the four axially shiftable components serves to displace the second and third components in one part of the varifocal range, e.g., between a position of minimum focal length $f_{min}$ and a position of intermediate focal length $f_{med}$, independently of the fifth and sixth components which are preferably held stationary at this time; the latter two components are displaceable by the adjusting mechanism in another part of the range, e.g., between the position of intermediate focal length $f_{med}$ and a position of maximum focal length $f_{max}$, independently of the second and third components which are preferably then held stationary.

Advantageously, the absolute values of the individual focal lengths of the third and fifth components exceeds those of the second and sixth components, respectively. This is particularly desirable if the objective has a diaphragm (preferably of the adjustable iris type) disposed between the two pairs of shiftable components, i.e., between the third and fifth components either adjacent or within the stationary fourth component; in that case the aforementioned ratio of individual focal lengths places the components of lesser refractivity closer to the diaphragm.

If, by analogy with conventional varifocal objectives having only one pair of shiftable components, the diaphragm is disposed in the ray path on the image side of both movable pairs, the size of the exit pupil remains unchanged so that no adjustment is needed to maintain a constant relative aperture throughout the varifocal range. In that event, however, the diameter of the front lens may have to be rather large in order to avoid undesirable vignetting. By placing the diaphragm between the third and fifth components, I avoid such vignetting even with moderate front-lens diameters but with the result that the relative aperture progressively decreases in that part of the varifocal range in which the change in overall focal length is realized by the shifting of the fifth and sixth components.. In order to maintain a constant relative aperture also in that case, I couple the adjustable diaphragm with the drive mechanism for the shiftable components in such a way that the diaphragm aperture increases in proportion to the overall focal length in that part of the range, especially between the positions of $f_{med}$ and $f_{max}$.

The term "substantially stationary" as applied above to the first component of my system implies a possible limited axial mobility of that component, or of a lens member thereof, for focusing purposes as is well known per se.

I have further found, in accordance with this invention, that the use of compound lens members in at least some of the components and particularly in the fifth component of the system is advantageous for suppressing spherical aberrations.

Whereas the mobile components may consist of a small number of lenses each, e.g., a single lens (or lens member) in the case of the third and fifth components, I prefer to design the stationary fourth and seventh components as multilens groups advantageously including each at least one negatively refracting member to reduce the optical aberrations. These aberrations are particularly affected by the seventh component and, toward the upper limit of the varifocal range, also by the first component.

BRIEF DESCRIPTION OF THE DRAWING

The above and other features of my invention will now be described in detail with reference to the accompanying drawing in which.

SPECIFIC DESCRIPTION

Figure 1:
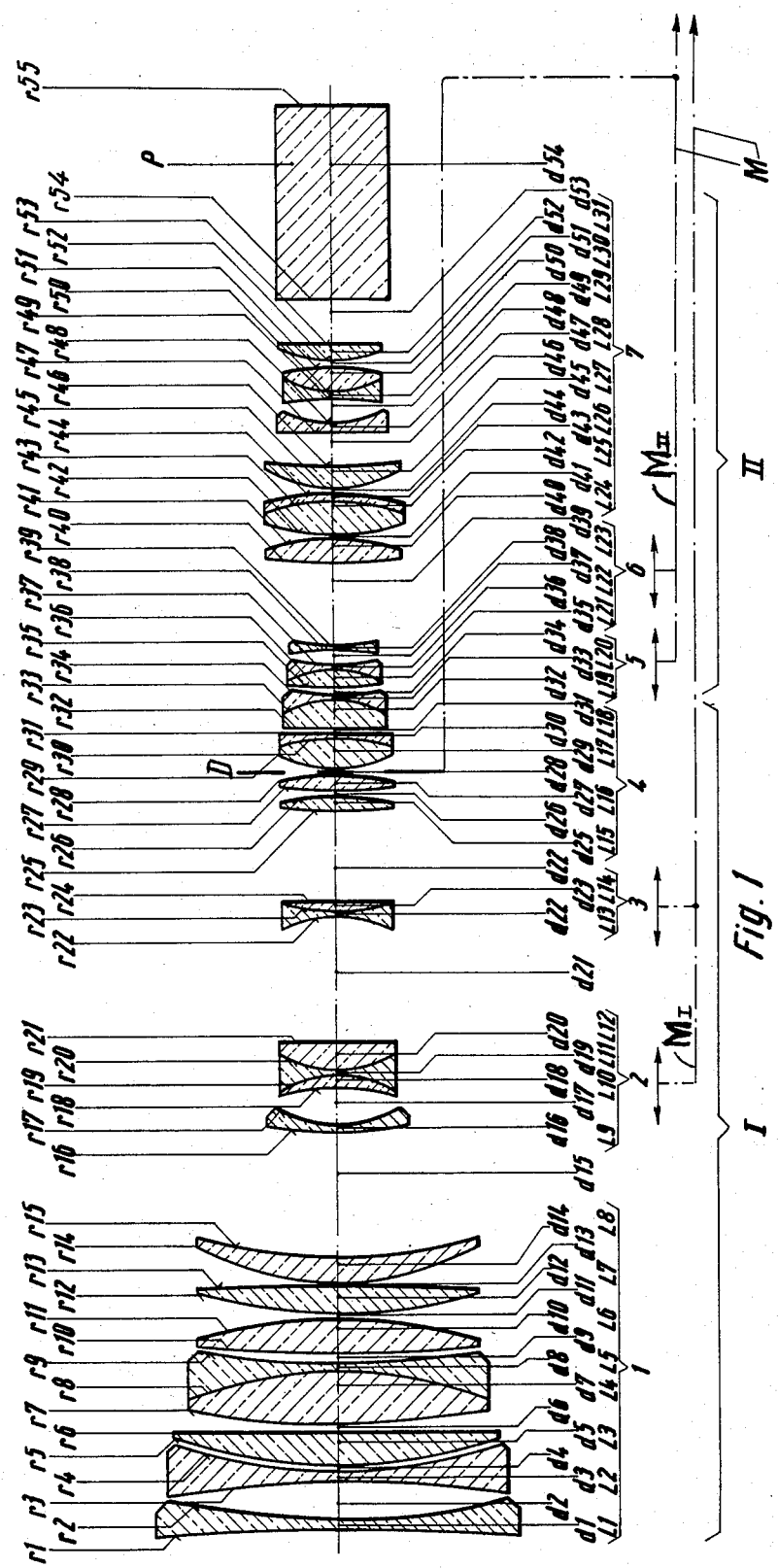
FIGS. 1, 2 and 3 are diagrammatic views of three different varifocal objective systems embodying my invention.

The varifocal objective shown in FIG. 1 comprises seven components 1 – 7, a diaphragm D within the middle component 4, and a prism P behing the last component 7. Components 1 – 4 constitute a front group I whereas components 5 – 7 form a rear group II, the two groups being interconnected as a unit. Component 1, which is substantially stationary and positively refracting, consists of eight lenses L1 – L8 with radii $r1 - r15$ and with thicknesses and separations $d1 - d14$. Lenses L4 and L5 form a doublet, the others being singlets.

A variable airspace $d15$ separates this first component from axially movable component 2 which is negatively refracting and consists of four lenses L9 – L12 with radii $r16 - r26$ and thicknesses and separations $d16 - d20$, the first of these lenses being a singlet whereas the other three form a triplet. Another variable airspace $d21$ intervenes between this second component and component 3, also negatively refracting and axially shiftable, which is in the form of a doublet consisting of lenses L13 and L14 with radii $r22 - r24$ and thicknesses $d22$, $d23$.

The third component is separated from stationary and positively refracting component 4 by a further variable airspace $d24$, this fourth component consisting of two singlets L15 and L16 and a doublet L17, L18 with radii $r24 - r31$ and with thicknesses and separations $d25 - d30$; diaphragm D is positioned in the space $d28$ preceding the doublet L17, L18.

Still another variable airspace $d31$ lies between components 4 and 5, the latter being a negatively refracting and axially shiftable doublet composed of lenses L19, L20 with radii $r32 - r35$ and thicknesses $d33$, $d34$.

Component 6, separated from the fifth component by yet another variable airspace $d34$, is also axially shiftable as well as negatively refracting and consists of three lenses L21 – L23 with radii $r35 - r39$ and with thicknesses and separation $d35 - d38$, the first two lenses L21, L22 of this component forming a doublet.

A final variable airspace $d39$ exists between the sixth component and component 7 which is stationary and positively refracting. This seventh component consists of eight lenses L24 – L31 with radii $r40 - r53$ and with thicknesses and separations $d40 - d52$, lenses L25, L26 and L29, L30 constituting two doublets while the remainder are singlets.

Prism P has an axial length $d54$ and planar transverse faces represented by radii $r54$ and $r55$ of infinite magnitude.

Representative numerical values for the radii $r1 - r55$ and for the axial distances $d1 - d54$ of the system of FIG. 1 in suitable longitudinal units (here millimeters) are given in the following Table I, together with the refractive indices $n_e$ and Abbe numbers $v_e$.

TABLE I

| Lenses | Radii | Thicknesses and separations | | $n_e$ | $v_e$ |
|---|---|---|---|---|---|
| L1 | $r1 = - 50.68$ | $d1$ | $=$ 0.19 | 1.643 | 59.9 |
|  | $r2 = + 13.02$ | $d2$ | $=$ 0.66 | | |
| L2 | $r3 = - 17.36$ | $d3$ | $=$ 0.19 | 1.643 | 59.9 |
|  | $r4 = + 9.14$ | $d4$ | $=$ 0.02 | | |
| L3 | $r5 = + 8.98$ | $d5$ | $=$ 0.63 | 1.694 | 31.0 |
|  | $r6 = - 105.91$ | $d6$ | $=$ 0.14 | | |
| L4 | $r7 = + 17.61$ | $d7$ | $=$ 0.82 | 1.680 | 54.9 |
| L5 | $r8 = - 7.48$ | $d8$ | $=$ 0.18 | 1.791 | 25.9 |
|  | $r9 = + 16.44$ | $d9$ | $=$ 0.15 | | |
| L6 | $r10 = + 42.11$ | $d10$ | $=$ 0.60 | 1.643 | 59.9 |
|  | $r11 = - 8.73$ | $d11$ | $=$ 0.00 | | |
| L7 | $r12 = + 9.87$ | $d12$ | $=$ 0.47 | 1.643 | 59.9 |

TABLE I-Continued

| Lenses | Radii | Thicknesses and separations | | $n_e$ | $v_e$ |
|---|---|---|---|---|---|
|  | $r13 = - 147.78$ | $d13$ | $=$ 0.00 | | |
| L8 | $r14 = + 5.13$ | $d14$ | $=$ 0.44 | 1.643 | 59.9 |
|  | $r15 = + 9.59$ | | | | |
|  |  | $d15$ | $=$ variable | | |
| L9 | $r16 = + 6.02$ | $d16$ | $=$ 0.12 | 1.792 | 47.2 |
|  | $r17 = + 2.21$ | $d17$ | $=$ 0.59 | | |
| L10 | $r18 = - 3.95$ | $d18$ | $=$ 0.19 | 1.761 | 27.4 |
| L11 | $r19 = - 2.37$ | $d19$ | $=$ 0.09 | 1.716 | 53.6 |
| L12 | $r20 = + 1.92$ | $d20$ | $=$ 0.44 | 1.723 | 29.3 |
|  | $r21 = + 19.16$ | | | | |
|  |  | $d21$ | $=$ variable | | |
| L13 | $r22 = - 2.35$ | $d22$ | $=$ 0.09 | 1.716 | 53.6 |
| L14 | $r23 = + 3.80$ | $d23$ | $=$ 0.19 | 1.727 | 29.0 |
|  | $r24 = - 27.68$ | | | | |
|  |  | $d24$ | $=$ variable | | |
| L15 | $r25 = + 20.68$ | $d25$ | $=$ 0.24 | 1.503 | 56.2 |
|  | $r26 = - 3.89$ | $d26$ | $=$ 0.00 | | |
| L16 | $r27 = + 8.66$ | $d27$ | $=$ 0.26 | 1.503 | 56.2 |
|  | $r28 = - 5.23$ | $d28$ | $=$ 0.12 | | |
| L17 | $r29 = + 2.32$ | $d29$ | $=$ 0.52 | 1.499 | 66.8 |
| L18 | $r30 = - 3.34$ | $d30$ | $=$ 0.09 | 1.761 | 27.4 |
|  | $r31 = - 55.07$ | | | | |
|  |  | $d31$ | $=$ variable | | |
| L19 | $r32 = - 98.52$ | $d32$ | $=$ 0.49 | 1.761 | 27.4 |
| L20 | $r33 = - 1.53$ | $d33$ | $=$ 0.07 | 1.734 | 28.5 |
|  | $r34 = + 3.71$ | | | | |
|  |  | $d34$ | $=$ variable | | |
| L21 | $r35 = + 7.39$ | $d35$ | $=$ 0.33 | 1.761 | 27.4 |
| L22 | $r36 = - 2.06$ | $d36$ | $=$ 0.09 | 1.792 | 47.2 |
|  | $r37 = + 3.62$ | $d37$ | $=$ 0.22 | | |
| L23 | $r38 = - 7.29$ | $d38$ | $=$ 0.09 | 1.792 | 47.2 |
|  | $r39 = + 4.67$ | | | | |
|  |  | $d39$ | $=$ variable | | |
| L24 | $r40 = + 12.23$ | $d40$ | $=$ 0.39 | 1.489 | 70.2 |
|  | $r41 = - 3.86$ | $d41$ | $=$ 0.00 | | |
| L25 | $r42 = + 4.19$ | $d42$ | $=$ 0.59 | 1.489 | 70.2 |
| L26 | $r43 = - 3.20$ | $d43$ | $=$ 0.14 | 1.694 | 31.0 |
|  | $r44 = - 5.34$ | $d44$ | $=$ 0.00 | | |
| L27 | $r45 = + 2.21$ | $d45$ | $=$ 0.36 | 1.489 | 70.2 |
|  | $r46 = + 11.44$ | $d46$ | $=$ 0.59 | | |
| L28 | $r47 = + 35.56$ | $d47$ | $=$ 0.14 | 1.792 | 47.2 |
|  | $r48 = + 2.09$ | $d48$ | $=$ 0.34 | | |
| L29 | $r49 = - 25.81$ | $d49$ | $=$ 0.12 | 1.792 | 47.2 |
| L30 | $r50 = + 1.83$ | $d50$ | $=$ 0.44 | 1.489 | 70.2 |
|  | $r51 = - 3.86$ | $d51$ | $=$ 0.00 | | |
| L31 | $r52 = + 2.04$ | $d52$ | $=$ 0.29 | 1.489 | 70.2 |
|  | $r53 = + 39.87$ | $d53$ | $=$ 0.78 | | |
| P | $r54 = \infty$ | $d54$ | $=$ 3.30 | 1.518 | 64.0 |
|  | $r55 = \infty$ | | | | |

The individual focal lengths $f_1 - f_7$ of components 1 – 7 are given in Table IA, below. This objective has an overall focal length $f$ ranging from $f_{min} = 1$ mm to $f_{max} = 29.6$ mm; its back-focal length (measured from the rear face $r55$ of prism P) equals 0.162 mm.

Figure 4:
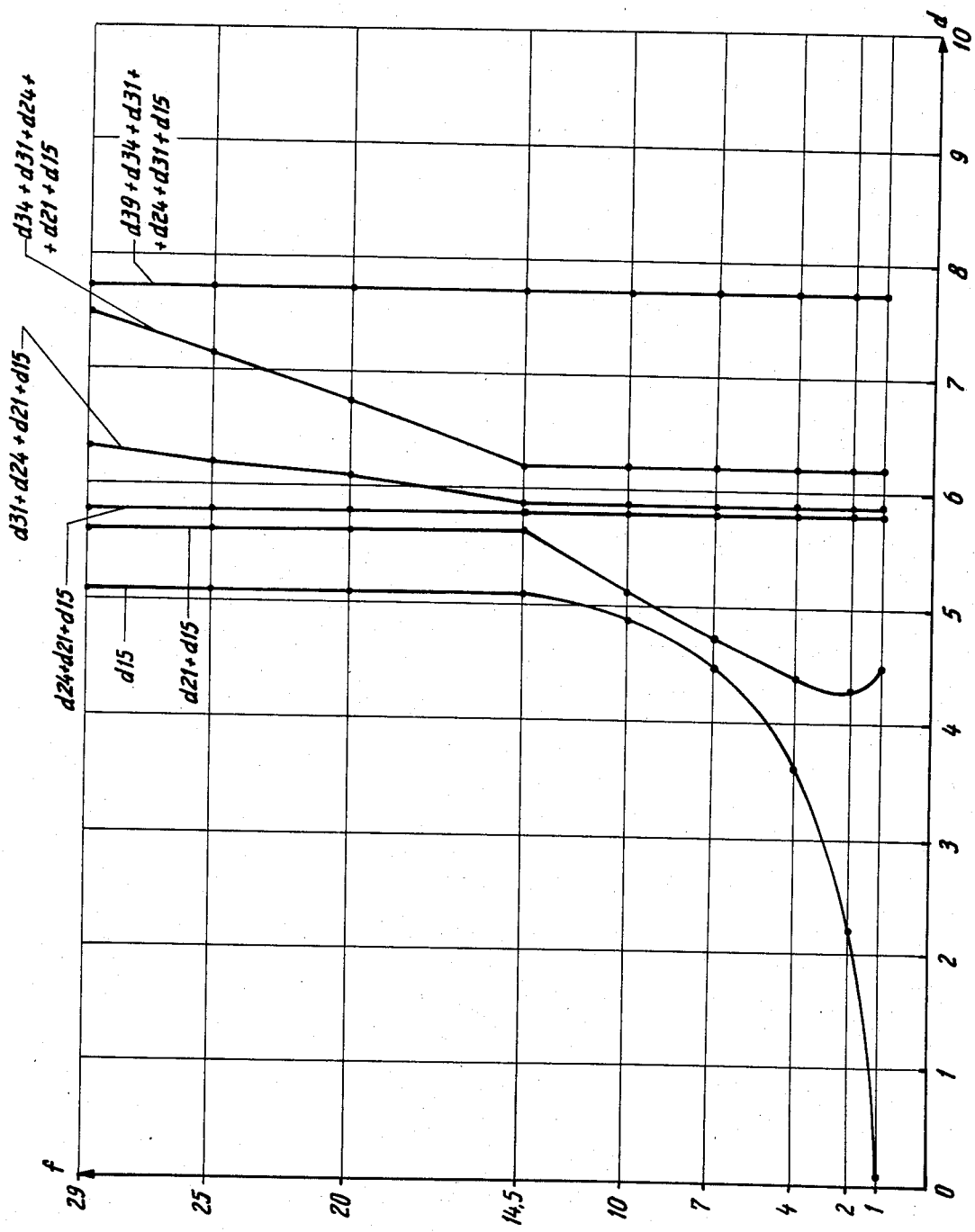
FIGS. 4, 5 and 6 are sets of graphs giving the law of motion for the movable components of FIGS. 1–3, respectively.

The four movable negative components 2, 3, 5 and 6 are displaceable, according to a predetermined law as illustrated in FIG. 4, under the control of a mechanism such as a cam drive schematically illustrated at M. Thus, components 2 and 3 are shifted by a first linkage $M_I$ in a lower part of the range, extending from minimum overall focal length $f_{min}$ to an intermediate overall focal length $f_{med} = 14.5$ mm, while components 5 and 6 are held stationary so that air spaces $d31$, $d34$ and $d39$ remain constant. In an upper part of the range, extending from $f_{med}$ to the maximum overall focal length $f_{max}$, components 2 and 3 occupy a fixed position whereas components 5 and 6 are displaced by a second linkage $M_{II}$ independent of linkage $M_I$; at that stage, therefore, airspaces $d15$, $d21$ and $d24$ remain constant. Specific values for these six variable airspaces, together with the corresponding overall focal lengths $f$, have been given in Table IB.

TABLE IA

Individual Focal Lengths

| | |
|---|---|
| $f_1 = + 6.901$ | $f_5 = - 5.310$ |
| $f_2 = - 2.167$ | $f_6 = - 2.463$ |
| $f_3 = - 3.650$ | $f_7 = + 2.773$ |
| $f_4 = + 2.207$ | |

TABLE IB

Variable Airspaces

| f | d15 | d21 | d24 | d31 | d34 | d39 |
|---|---|---|---|---|---|---|
| 1.0 | 0.013 | 4.456 | 1.418 | 0.068 | 0.123 | 1.439 |
| 2.0 | 2.144 | 2.143 | 1.600 | 0.068 | 0.123 | 1.439 |
| 4.0 | 3.644 | 0.664 | 1.579 | 0.068 | 0.123 | 1.439 |
| 7.0 | 4.508 | 0.177 | 1.202 | 0.068 | 0.123 | 1.439 |
| 10.0 | 4.900 | 0.263 | 0.724 | 0.068 | 0.123 | 1.439 |
| 14.5 | 5.174 | 0.675 | 0.038 | 0.068 | 0.123 | 1.439 |
| 20.0 | 5.174 | 0.675 | 0.038 | 0.422 | 0.340 | 0.868 |
| 25.0 | 5.174 | 0.675 | 0.038 | 0.541 | 0.687 | 0.402 |
| 29.6 | 5.174 | 0.675 | 0.038 | 0.574 | 1.042 | 0.014 |

If the opening of iris diaphragm D is left unchanged, the relative aperture of the system has a constant value of 1 : 2.1 in the subrange $f_{min} - f_{med}$ and decreases progressively to a final value of 1 : 6.3 in the subrange $f_{med} - f_{max}$. However, pursuant to another feature of my invention and as shown in FIG. 1, mechanism M is also coupled to diaphragm D to increase its opening in the upper subrange, proportionally to the change in overall focal length $f$, so as to maintain the same relative aperture of 1 : 2.1 throughout the entire range.

For focusing purposes the front lens L1 of component 1 may be limitedly axially adjustable.

Front and rear groups I and II (as well as their counterparts I', II' and I'', II'' in FIGS. 2 and 3), when taken by themselves, have their own invariable image planes. In fact, they may be considered as two four-component varifocal systems in tandem, with the middle component 4 (or 4', 4'') common to both systems.

Figure 2:
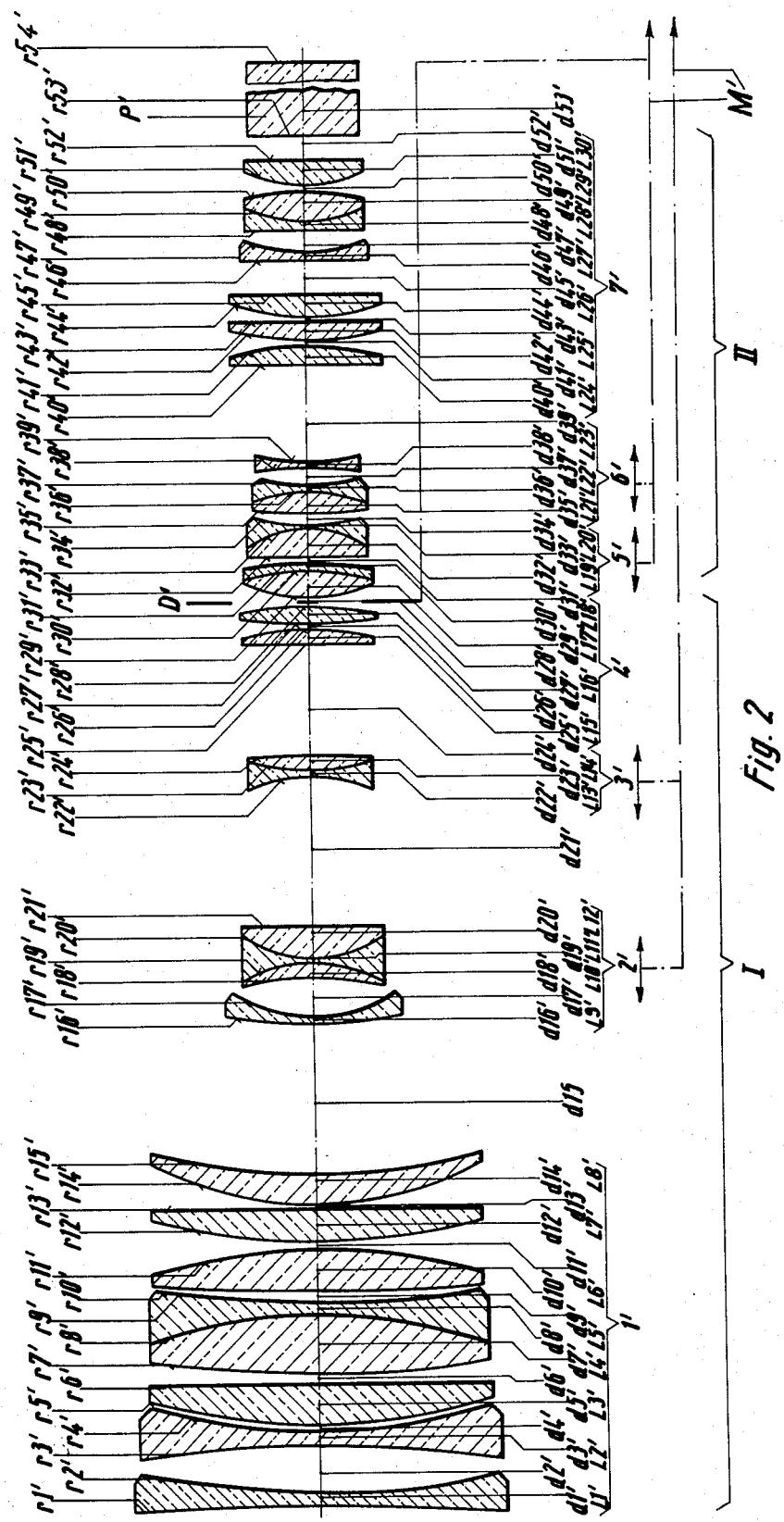

In FIG. 2 I have shown a generally similar objective according to my invention whose seven components 1' – 7' and associated prism P' have radii $r1'$ and $r54'$ and axial distances $d1' - d53'$ as listed, together with the corresponding refractive indices $n_e$ and Abbe numbers $\nu_e$, in Table II below.

Components 1' – 6' are virtually identical with their counterparts 1 – 6, except for the specific values of their parameters; component 7', however, has only seven lenses L24' – L30' forming one doublet L28', L29'. This system has a minimum focal length $f_{min} = 1$ mm, an intermediate focal length $f_{med} = 14.7$ mm and a maximum focal length $f_{max} = 30$ mm. Its back-focal length is 0.234 mm. With an unchanged opening of its diaphragm D', its relative aperture equals 1 : 1.7 up to $f_{med}$ and thereafter progressively decreases to 1 : 5.1; again, the coupling of this diaphragm with control mechanism M' is such as to increase the diaphragm opening in the upper subrange with maintenance of the same relative aperture of 1 : 1.7 throughout the entire range.

TABLE II

| | Lenses | Radii | Thicknesses and separations | | $n_e$ | $\nu_e$ |
|---|---|---|---|---|---|---|
| 1' | L1' | $r1' = - 63.71$ $r2' = + 16.37$ | d1' = | 0.24 | 1.643 | 59.9 |
| | | | d2' = | 0.83 | | |
| | L2' | $r3' = - 21.82$ $r4' = + 11.49$ | d3' = | 0.24 | 1.643 | 59.9 |
| | | | d4' = | 0.03 | | |
| | L3' | $r5' = + 11.29$ $r6' = - 133.12$ | d5' = | 0.79 | 1.694 | 31.0 |
| | | | d6' = | 0.18 | | |
| | L4' | $r7' = + 22.13$ $r8' = - 9.41$ | d7' = | 1.04 | 1.680 | 54.9 |
| | L5' | $r9' = + 20.66$ | d8' = | 0.22 | 1.791 | 25.9 |
| | | | d9' = | 0.19 | | |
| | L6' | $r10' = + 52.94$ $r11' = - 10.97$ | d10' = | 0.75 | 1.643 | 59.9 |
| | | | d11' = | 0.00 | | |
| | L7' | $r12' = + 12.40$ $r13' = - 185.75$ | d12' = | 0.60 | 1.643 | 59.9 |
| | | | d13' = | 0.00 | | |
| | L8' | $r14' = + 6.46$ $r15' = + 12.06$ | d14' = | 0.55 | 1.643 | 59.9 |
| | | | d15' = | variable | | |
| 2' | L9' | $r16' = + 7.57$ $r17' = 2.78$ | d16' = | 0.15 | 1.792 | 47.2 |
| | | | d17' = | 0.74 | | |
| | L10' | $r18' = - 4.96$ $r19' = - 2.98$ | d18' = | 0.24 | 1.761 | 27.4 |
| | L11' | | d19' = | 0.12 | 1.716 | 53.6 |
| | L12' | $r20' = + 2.42$ $r21' = + 24.08$ | d20' = | 0.55 | 1.723 | 29.3 |
| | | | d21' = | variable | | |
| 3' | L13' | $r22' = - 2.95$ $r23' = + 4.78$ | d22' = | 0.12 | 1.716 | 53.6 |
| | L14' | $r24' = - 34.79$ | d23' = | 0.24 | 1.727 | 29.0 |
| | | | d24' = | variable | | |
| 4' | L15' | $r25' = + 26.00$ $r26' = - 4.89$ | d25' = | 0.30 | 1.503 | 56.2 |
| | | | d26' = | 0.00 | | |
| | L16' | $r27' = + 10.88$ $r28' = - 6.57$ | d27' = | 0.32 | 1.503 | 56.2 |
| | | | d28' = | 0.15 | | |
| | L17' | $r29' = + 2.92$ $r30' = - 4.21$ | d29' = | 0.66 | 1.499 | 66.8 |
| | L18' | $r31' = - 69.22$ $r32' = - 123.83$ | d30' = | 0.12 | 1.761 | 27.4 |
| | | | d31' = | variable | | |

TABLE II-Continued

| Lenses | | Radii | Thicknesses and separations | | $n_e$ | $v_e$ |
|---|---|---|---|---|---|---|
| 5' | L19' [ | r33'= − 1.93 | d32' | = 0.61 | 1.761 | 27.4 |
| | L20' [ | r34'= + 4.67 | d33' | = 0.09 | 1.734 | 28.5 |
| | | | d34' | = variable | | |
| 6' | L21' [ | r35'= + 9.29 | d35' | = 0.41 | 1.761 | 27.4 |
| | L22' [ | r36'= − 2.59 | d36' | = 0.12 | 1.792 | 47.2 |
| | | r37'= + 4.55 | d37' | = 0.27 | | |
| | L23' [ | r38'= − 9.17 | d38' | = 0.12 | 1.792 | 47.2 |
| | | r39'= + 5.88 | d39' | = variable | | |
| 7' | L24' [ | r''= + 15.38 | d40' | = 0.49 | 1.489 | 70.2 |
| | | r42'= − 4.86 | d41' | = 0.00 | | |
| | L25' [ | r42'= + 6.06 | d42' | = 0.37 | 1.585 | 46.2 |
| | | r43'= + 46.74 | d43' | = 0.00 | | |
| | L26' [ | r44'= + 3.69 | d44' | = 0.50 | 1.489 | 70.2 |
| | | r45'= − 75.23 | d45' | = 0.68 | | |
| | L27' [ | r46'= + 24.82 | d46' | = 0.18 | 1.792 | 47.2 |
| | | r47'= + 3.31 | d47' | = 0.43 | | |
| | L28' [ | r48'= + 75.23 | d48' | = 0.15 | 1.761 | 27.4 |
| | | r49'= + 2.42 | d49' | = 0.68 | 1.503 | 56.2 |
| | L29' [ | r50'= − 4.96 | d50' | = 0.00 | | |
| | L30' [ | r51'= + 2.61 | d51' | = 0.46 | 1.574 | 57.3 |
| | | r52'= + 21.17 | d52' | = 0.49 | | |
| P' | [ | r53'= ∞ | d53' | = 4.49 | 1.518 | 64.0 |
| | | r54'= ∞ | | | | |

Figure 5:
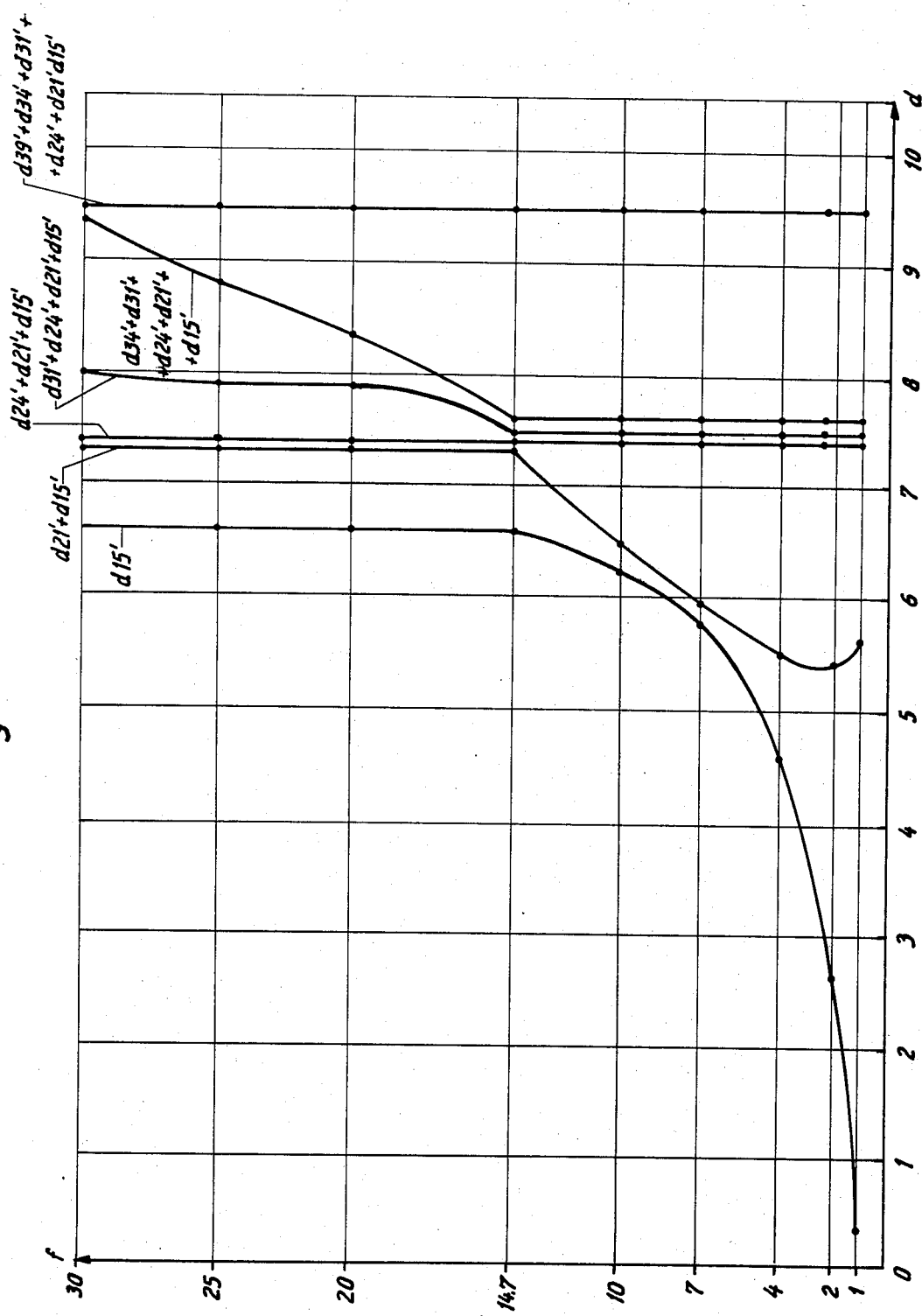

The individual focal lengths $f_1' - f_7'$ of components 1' − 7' are given in Table IIA. The law of variation of airspaces $d15'$, $d21'$, $d24'$, $d30'$, $d34'$ and $d39'$ is plotted in FIG. 5, with representative values listed in Table IIB together with the corresponding overall focal lengths $f$.

TABLE IIA

Individual Focal Lengths $f_1' = + 8.675$   $f_5' = − 6.675$
$f_2' = − 2.724$   $f_6' = − 3.098$
$f_3' = − 4.588$   $f_7' = + 3.412$
$f_4' = + 2.774$

TABLE IIB

| | | | Variable Airspaces | | | |
|---|---|---|---|---|---|---|
| f | d15' | d21' | d24' | d31' | d34' | d39' |
| 1.0 | 0.017 | 5.600 | 1.783 | 0.085 | 0.155 | 1.808 |
| 2.0 | 2.696 | 2.693 | 2.011 | 0.085 | 0.155 | 1.808 |
| 4.0 | 4.580 | 0.835 | 1.985 | 0.085 | 0.155 | 1.808 |
| 7.0 | 5.667 | 0.222 | 1.511 | 0.085 | 0.155 | 1.808 |
| 10.0 | 6.159 | 0.330 | 0.911 | 0.085 | 0.155 | 1.808 |
| 14.7 | 6.512 | 0.872 | 0.016 | 0.085 | 0.155 | 1.808 |
| 20.0 | 6.512 | 0.872 | 0.016 | 0.519 | 0.410 | 1.121 |
| 25.0 | 6.512 | 0.872 | 0.016 | 0.675 | 0.835 | 0.538 |
| 30.0 | 6.512 | 0.872 | 0.016 | 0.722 | 1.313 | 0.013 |

Figure 3:
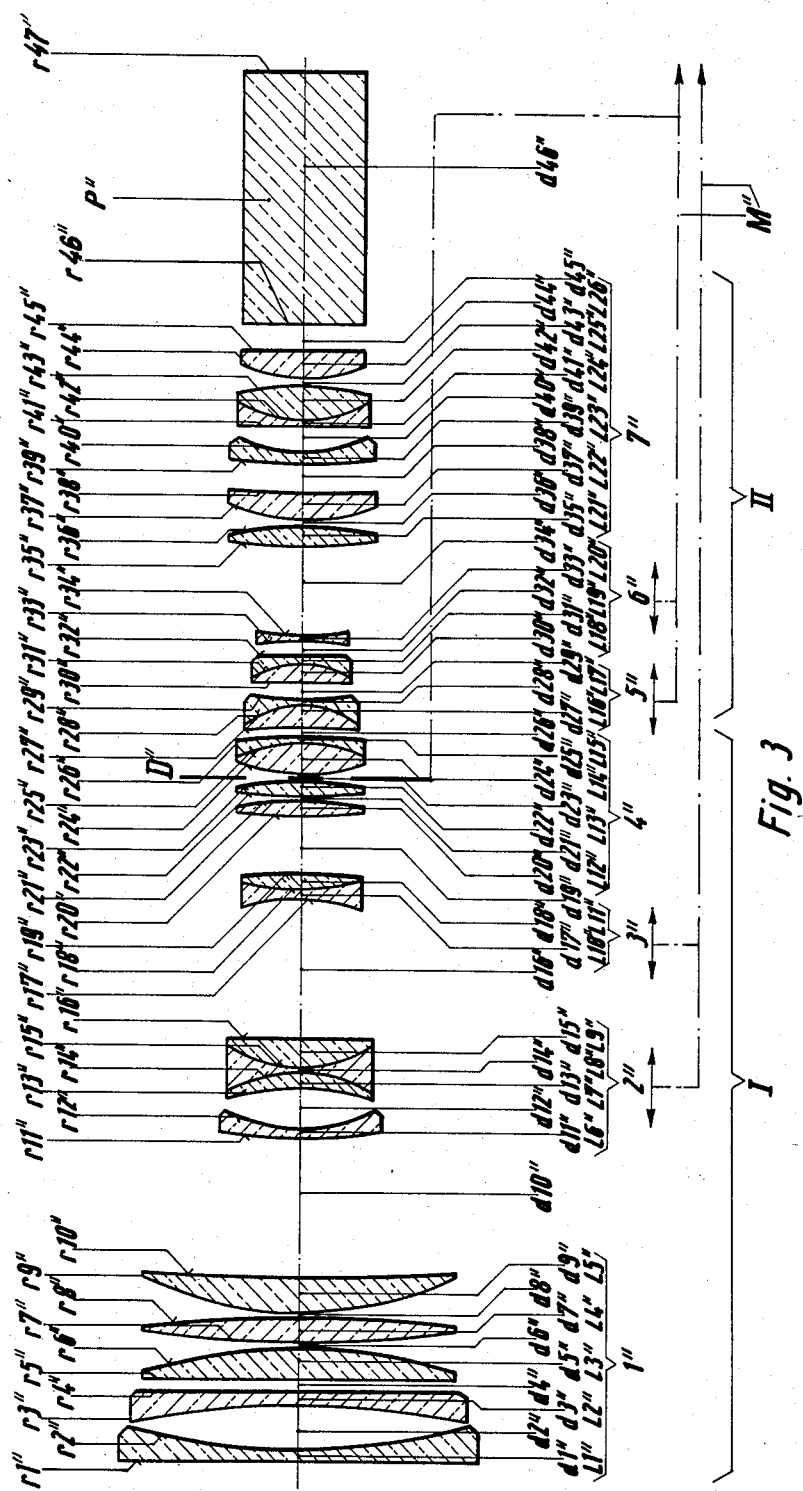

The system of FIG. 3 differs from the preceding ones in that its first component 1'' and its last component 7'' have only five lenses L1'' − L5'' and six lenses L21'' − L26'', respectively; component 1'', which may be bodily shiftable for focusing purposes, consists exclusively of singlets whereas component 7'' again has one doublet L24'', L25''. The radii $r1'' - r27''$ and the axial distances $d1'' - d46''$ of lenses L1'' − L26'' and of the associated prism P'' are listed in the following Table III, together with the corresponding refractive indices $n_e$ and Abbe numbers $v_e$.

TABLE III

| | Lenses | Radii | Thicknesses and separations | | $n_e$ | $v_e$ |
|---|---|---|---|---|---|---|
| 1'' | L1'' [ | r1''= + 210.11 | d1'' | = 0.23 | 1.727 | 29.0 |
| | | r2''= + 10.98 | d2'' | = 0.72 | | |
| | L2'' [ | r3''= − 15.37 | d3'' | = 0.23 | 1.761 | 27.4 |
| | | r4''= ∞ | d4'' | = 0.22 | | |
| | L3'' [ | r5''= − 210.11 | d5'' | = 0.52 | 1.643 | 59.9 |
| | | r6''= − 9.64 | d6'' | = 0.00 | | |
| | L4'' [ | r7''= + 19.04 | d7'' | = 0.48 | 1.643 | 59.9 |
| | | r8''= − 26.71 | d8'' | = 0.00 | | |
| | L5'' [ | r9''= + 6.22 | d9'' | = 0.63 | 1.643 | 59.9 |
| | | r10''= + 44.85 | d10'' | = variable | | |
| 2'' | L6'' [ | r11''= + 8.88 | d11'' | = 0.14 | 1.792 | 47.2 |
| | | r12''= + 2.73 | d12'' | = 0.69 | | |
| | L7'' [ | r13''= − 4.20 | d13'' | = 0.23 | 1.761 | 27.4 |
| | | r14''= − 2.63 | | | | |
| | L8'' [ | r15''= + 2.17 | d14'' | = 0.11 | 1.716 | 53.6 |
| | L9'' [ | r16''= + 23.05 | d15'' | = 0.46 | 1.723 | 29.3 |
| | | | d16'' | = variable | | |
| 3'' | L10'' [ | r17''= − 2.90 | d17'' | = 0.11 | 1.716 | 53.6 |
| | L11'' | r18''= + 4.56 | d18'' | = 0.23 | 1.727 | 29.0 |
| | | r19''= − 20.49 | d19'' | = variable | | |
| 4'' | L12'' [ | r20''= + 11.65 | d20'' | = 0.23 | 1.499 | 66.8 |
| | | r<''= − 5.37 | d21'' | = 0.00 | | |
| | L13'' [ | r22''= + 9.23 | d22'' | = 0.23 | 1.499 | 66.8 |
| | | r23''= − 5.75 | d23'' | = 0.14 | | |
| | L14'' [ | r24''= + 3.19 | d24'' | = 0.49 | 1.499 | 66.8 |
| | | r25''= − 2.90 | d25'' | = 0.11 | 1.761 | 27.4 |
| | L15'' [ | r26''= − 8.51 | d26'' | = variable | | |
| 5'' | L16 [ | r27''= − 13.87 | d27'' | = 0.40 | 1.761 | 27.4 |
| | | r28''= − 1.51 | d28'' | = 0.08 | 1.734 | 28.5 |
| | L17'' | r29''= + 6.10 | d29'' | = variable | | |
| | | r30''= − 32.00 | d30'' | = 0.30 | 1.746 | 28.0 |
| 6'' | L18'' [ | r31''= − 1.69 | d31'' | = 0.11 | 1.792 | 47.2 |
| | L19 [ | r32''= + 16.67 | d32'' | = 0.26 | | |
| | | r33''= − 6.69 | d33'' | = 0.11 | 1.792 | 47.2 |
| | L20'' | | | | | |

TABLE III-Continued

| Lenses | Radii | Thicknesses and separations | | $n_r$ | $v_e$ |
|---|---|---|---|---|---|
| | r34''=+ 6.03 | d34'' | = variable | | |
| | r35''=+ 9.47 | | | | |
| L21'' | | d35'' | = 0.34 | 1.694 | 31.0 |
| | r36''=− 5.40 | | | | |
| | | d36'' | = 0.00 | | |
| | r37''=+ 3.32 | | | | |
| L22'' | | d37'' | = 0.40 | 1.716 | 53.6 |
| | r38''=+ 15.23 | | | | |
| 7'' | | d38'' | = 0.58 | | |
| | r39''=+ 11.40 | | | | |
| L23'' | | d39'' | = 0.17 | 1.761 | 27.4 |
| | r40''=+ 2.61 | | | | |
| | | d40'' | = 0.40 | | |
| | r41''=+ 32.67 | | | | |
| L24'' | | d41'' | = 0.14 | 1.761 | 27.4 |
| | r42''=+ 2.25 | | | | |
| L25'' | | d42'' | = 0.63 | 1.489 | 70.2 |
| | r43''=− 4.71 | | | | |
| | | d43'' | = 0.00 | | |
| | r44''=+ 2.57 | | | | |
| L26'' | | d44'' | = 0.43 | 1.643 | 59.9 |
| | r45''=+ 52.79 | | | | |
| | | d45'' | = 0.46 | | |
| | r46''= ∞ | | | | |
| P'' | | d46'' | = 4.22 | 1.518 | 64.0 |
| | r47''= ∞ | | | | |

Figure 6:
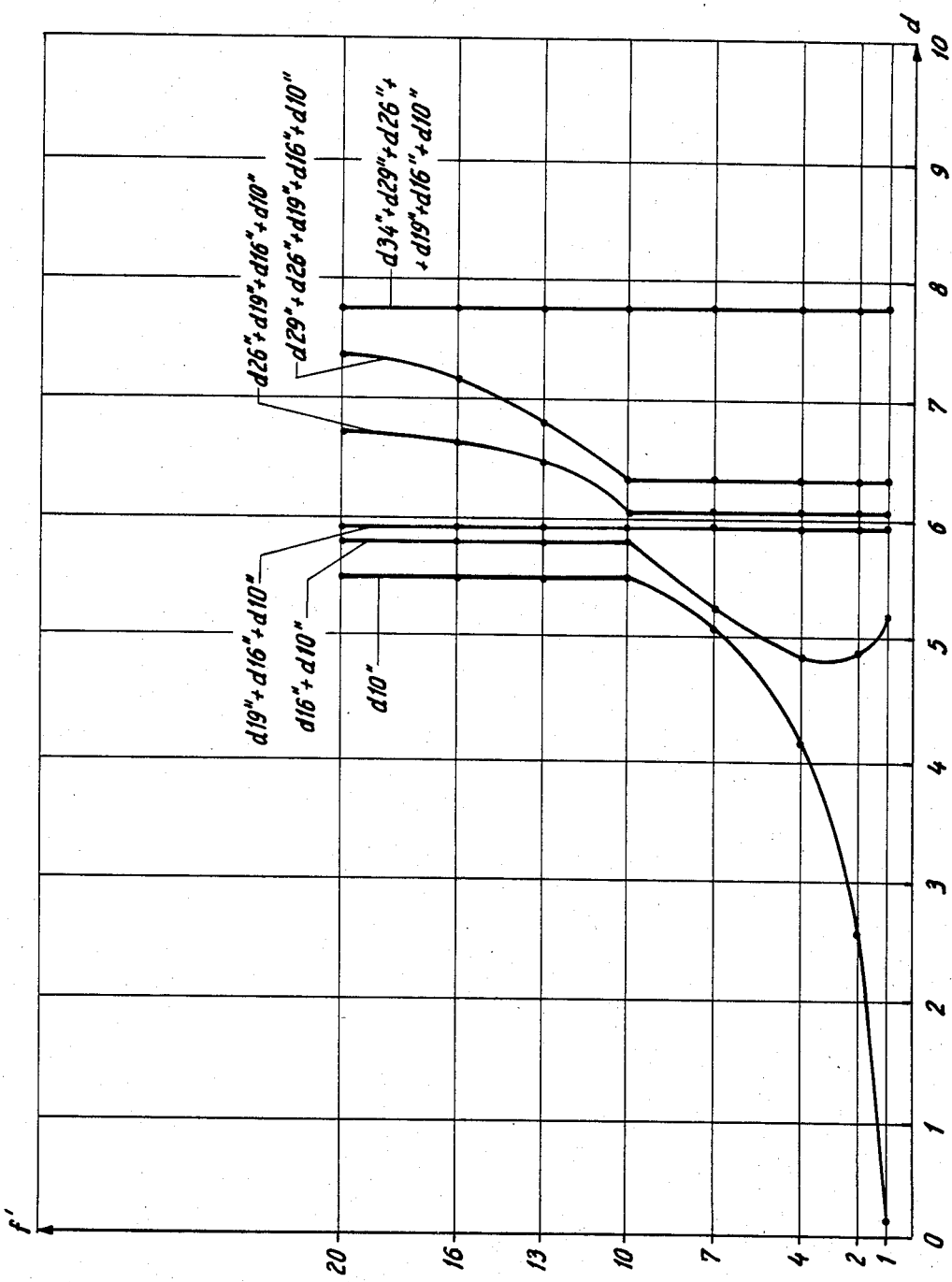

The critical focal lengths of the system of FIG. 3 are $f_{min} = 1$ mm, $f_{med} = 10$ mm and $f_{max} = 20$ mm. Its backfocal length is 0.499 mm. The individual focal lengths $f_1'' - f_7''$ of components 1'' – 7'' are given in Table IIIA below. The relationship of the variable airspaces $d10''$, $d16''$, $d19''$, $d26''$, $d29''$ and $d34''$ has been plotted in FIG. 6, with representative values given in Table IIIB together with the corresponding overall focal lengths $f$.

TABLE IIIA

Individual Focal lengths

| | |
|---|---|
| $f_1''= + 8.141$ | $f_5''= − 6.309$ |
| $f_2''= − 2.384$ | $f_6''= − 2.791$ |
| $f_3''= − 4.843$ | $f_7''= + 3.012$ |
| $f_4''= + 2.413$ | |

TABLE IIIB

| | Variable Airspaces | | | | | |
|---|---|---|---|---|---|---|
| f | d10'' | d16'' | d19'' | d26'' | d29'' | d34'' |
| 1.0 | 0.020 | 5.132 | 0.814 | 0.046 | 0.271 | 1.490 |
| 2.0 | 2.455 | 2.415 | 1.096 | 0.046 | 0.271 | 1.490 |
| 4.0 | 4.157 | 0.701 | 1.108 | 0.046 | 0.271 | 1.490 |
| 7.0 | 5.134 | 0.201 | 0.631 | 0.046 | 0.271 | 1.490 |
| 10.0 | 5.573 | 0.378 | 0.015 | 0.046 | 0.271 | 1.490 |
| 13.0 | 5.573 | 0.378 | 0.015 | 0.534 | 0.243 | 1.030 |
| 16.0 | 5.573 | 0.378 | 0.015 | 0.788 | 0.418 | 0.601 |
| 20.0 | 5.573 | 0.378 | 0.015 | 0.941 | 0.786 | 0.080 |

With the diaphragm D'' held at a constant opening, the relative aperture of the system of FIG. 2 remains at 1 : 2 up to $f_{med}$ and thereafter decreases progressively to a final value of 1 :4; as before, a coupling between this diaphragm and control mechanism M'' maintains a constant relative aperture of 1 : 2 throughout the range by progressively increasing its opening in the upper subrange proportionally to the change in the overall focal length.

Although the aforedescribed staggered displacement of the two pairs of negative components in continuous subranges is preferred for the sake of simplicity, it is possible to arrive from the starting position ($f_{min}$) at the end position ($f_{max}$) over a variety of routes which could include an inversion of the sequence (i.e., a shifting of the fifth and sixth components in the lower subrange and a shifting of the second and third components in the upper subrange) or several alternations between the two component pairs. The possibility of jointly shifting the four components in all or part of the range is also not excluded. However, since any shift of the rear pair affects the diameter of the exit pupil if the diaphragm is disposed between the two mobile pairs, such a shift should always be accompanied by a corresponding change in diaphragm opening if a constant aperture ratio throughout the varifocal range is desired.

Naturally, the systems of FIGS. 1, 2 and 3 will remain operative also in the case of deviations, within the usual tolerance ranges, from the specific numerical values given in Tables I, II and III.

Mechanisms M, M' and M'' are representative of a variety of mechanical or electromechanical linkages known per se. They may each be split into two sections, as shown, for handling the first shiftable lens pair alone in the lower subrange and for actuating the second shiftable lens pair jointly with the diaphragm in the upper subrange.

I claim:

1. A varifocal objective comprising:
   an optical system with seven refractive components on a common optical axis, including a substantially fixed first component of positive refractivity with individual focal length $f_1$, an axially shiftable second component of negative refractivity with individual focal length $f_2$, an axially shiftable third component of negative refractivity with individual focal length $f_3$, a fixed fourth component of positive refractivity with individual focal length $f_4$, an axially shiftable fifth component of negative refractivity with individual focal length $f_5$, an axially shiftable sixth component of negative refractivity with individual focal length $f_6$, and a fixed seventh component of positive refractivity with individual focal length $f_7$; the individual focal lengths of said fixed components having the relationship $f_1 > f_7 > f_4$, the individual focal lengths of said shiftable components having the relationship $|f_3| > |f_2|$ and $|f_5| > |f_6|$, with $f_1 > |f_5| > |f_3|$ and with the absolute values of $f_4$, $f_6$ and $f_7$ all smaller than $|f_3|$; and mechanism coupled with said axially shiftable components for jointly displacing said second and third components while holding said fifth and sixth components stationary in one part of a varifocal range and for jointly displacing said fifth and sixth components while holding said second and third components stationary in another part of said range adjoining said one part, with maintenance of an invariable image plane throughout said range.

2. A varifocal objective as defined in claim 1 wherein said second through seventh components each include at least one compound lens member.

3. A varifocal objective as defined in claim 1 wherein said first component consists of eight lenses L1 – L8, said second component consists of four lenses L9 –

L12, said third component consists of two lenses L13, L14, said fourth component consists of four lenses L15 – L18, said fifth component consists of two lenses L19, L20, said sixth component consists of three lenses L21 – L23, and said seventh component consists of eight lenses L24 – L31; the relative numerical values of the radii $r1 - r53$ and of the thicknesses and separations $d1 - d52$ of said lenses L7 – L31, the magnitudes of their refractive indices $n_e$ and the magnitudes of their Abbe numbers $\nu_e$ being substantially as given in the following Table:

TABLE I

| Lenses | Radii | Thicknesses and separations | $n_e$ | $\nu_e$ |
|---|---|---|---|---|
| L1 | r1= − 50.68 | d1 = 0.19 | 1.643 | 59.9 |
|  | r2= + 13.02 | d2 = 0.66 |  |  |
| L2 | r3= − 17.36 | d3 = 0.19 | 1.643 | 59.9 |
|  | r4= + 9.14 | d4 = 0.02 |  |  |
| L3 | r5= + 8.98 | d5 = 0.63 | 1.694 | 31.0 |
|  | r6= − 105.91 | d6 = 0.14 |  |  |
| L4 | r7= + 17.61 | d7 = 0.82 | 1.680 | 54.9 |
|  | r8= − 7.48 | d8 = 0.18 | 1.791 | 25.9 |
| L5 | r9= + 16.44 | d9 = 0.15 |  |  |
| L6 | r10= + 42.11 | d10 = 0.60 | 1.643 | 59.9 |
|  | r11= − 8.73 | d11 = 0.00 |  |  |
| L7 | r12= + 9.87 | d12 = 0.47 | 1.643 | 59.9 |
|  | r13= − 147.78 | d13 = 0.00 |  |  |
| L8 | r14= + 5.13 | d14 = 0.44 | 1.643 | 59.9 |
|  | r15= + 9.59 | d15 = variable |  |  |
| L9 | r16= + 6.02 | d16 = 0.12 | 1.792 | 47.2 |
|  | r17= + 2.21 | d17 = 0.59 |  |  |
| L10 | r18= − 3.95 | d18 = 0.19 | 1.761 | 27.4 |
| L11 | r19= − 2.37 | d19 = 0.09 | 1.716 | 53.6 |
| L12 | r20= + 1.92 | d20 = 0.44 | 1.723 | 29.3 |
|  | r21= + 19.16 | d21 = variable |  |  |
| L13 | r22= − 2.35 | d22 = 0.09 | 1.716 | 53.6 |
| L14 | r23= + 3.80 | d23 = 0.19 | 1.727 | 29.0 |
|  | r24= − 27.68 | d24 = variable |  |  |
| L15 | r25= + 20.68 | d25 = 0.24 | 1.503 | 56.2 |
|  | r26= − 3.89 | d26 = 0.00 |  |  |
| L16 | r27= + 8.66 | d27 = 0.26 | 1.503 | 56.2 |
|  | r28= − 5.23 | d28 = 0.12 |  |  |
| L17 | r29= + 2.32 | d29 = 0.52 | 1.499 | 66.8 |
|  | r30= − 3.34 | d30 = 0.09 | 1.761 | 27.4 |
| L18 | r31= − 55.07 | d31 = variable |  |  |
| L19 | r32= − 98.52 | d32 = 0.49 | 1.761 | 27.4 |
| L20 | r33= − 1.53 | d33 = 0.07 | 1.734 | 28.5 |
|  | r34= + 3.71 | d34 = variable |  |  |
| L21 | r35= + 7.39 | d35 = 0.33 | 1.761 | 27.4 |
|  | r36= − 2.06 |  |  |  |

TABLE I-Continued

| Lenses | Radii | Thicknesses and separations | $n_e$ | $\nu_e$ |
|---|---|---|---|---|
| L22 | r37= + 3.62 | d36 = 0.09 | 1.792 | 47.2 |
|  |  | d37 = 0.22 |  |  |
|  | r38= − 7.29 |  |  |  |
| L23 | r39= + 4.67 | d38 = 0.09 | 1.792 | 47.2 |
|  |  | d39 = variable |  |  |
|  | r40= + 12.23 |  |  |  |
| L24 | r41= − 3.86 | d40 = 0.39 | 1.489 | 70.2 |
|  |  | d41 = 0.00 |  |  |
|  | r42= + 4.19 |  |  |  |
| L25 | r43= − 3.20 | d42 = 0.59 | 1.489 | 70.2 |
| L26 | r44= − 5.34 | d43 = 0.14 | 1.694 | 31.0 |
|  |  | d44 = 0.00 |  |  |
|  | r45= + 2.21 |  |  |  |
| L27 | r46= + 11.44 | d45 = 0.36 | 1.489 | 70.2 |
|  |  | d46 = 0.59 |  |  |
|  | r47= + 35.56 |  |  |  |
| L28 | r48= + 2.09 | d47 = 0.14 | 1.792 | 47.2 |
|  |  | d48 = 0.34 |  |  |
|  | r49= − 25.81 |  |  |  |
| L29 | r50= + 1.83 | d49 = 0.12 | 1.792 | 47.2 |
| L30 | r51= − 3.86 | d50 = 0.44 | 1.489 | 70.2 |
|  |  | d51 = 0.00 |  |  |
| L31 | r52= + 2.04 | d52 = 0.29 | 1.489 | 70.2 |
|  | r53= + 39.87 |  |  |  |

4. A varifocal objective as defined in claim 1 wherein said first component consists of eight lenses L1′ – L8′, said second component consists of four lenses L9′ – L12′, said third component consists of two lenses L13′, 14′, said fourth component consists of four lenses L15′ – L18′, said fifth component consists of two lenses L19′, L20′, said sixth component consists of three lenses L21′ – L23′, and said seventh component consists of seven lenses L24′ – L30′; the relative numerical values of the radii $r1′ - r52′$ and of the thicknesses and separations $d1′ - d51′$ of said lenses L1′ – L30′, the magnitudes of their refractive indices $n_e$ and the magnitudes of their Abbe numbers $\nu_e$ being substantially as given in the following Table:

TABLE II

| Lenses | Radii | Thicknesses and separations | $n_e$ | $\nu_e$ |
|---|---|---|---|---|
| L1′ | r1′= − 63.71 | d1′ = 0.24 | 1.643 | 59.9 |
|  | r2′= + 16.37 | d2′ = 0.83 |  |  |
| L2′ | r3′= − 21.82 | d3′ = 0.24 | 1.643 | 59.9 |
|  | r4′= + 11.49 | d4′ = 0.03 |  |  |
| L3′ | r5′= + 11.29 | d5′ = 0.79 | 1.694 | 31.0 |
|  | r6′= − 133.12 | d6′ = 0.18 |  |  |
| L4′ | r7′= + 22.13 | d7′ = 1.04 | 1.680 | 54.9 |
|  | r8′= − 9.41 | d8′ = 0.22 | 1.791 | 25.9 |
| L5′ | r9′= + 20.66 | d9′ = 0.19 |  |  |
| L6′ | r10′= + 52.94 | d10′ = 0.75 | 1.643 | 59.9 |
|  | r11′= − 10.97 | d11′ = 0.00 |  |  |
| L7′ | r12′= + 12.40 | d12′ = 0.60 | 1.643 | 59.9 |
|  | r13′= − 185.75 |  |  |  |

TABLE II-Continued

| Lenses | | Radii | Thicknesses and separations | | $n_e$ | $v_e$ |
|---|---|---|---|---|---|---|
| 2' | L8' | r14'=+ 6.46 | d13' | = 0.00 | | |
| | | r15'=+ 12.06 | d14' | = 0.55 | 1.643 | 59.9 |
| | | | d15' | = variable | | |
| | L9' | r16'=+ 7.57 | d16' | = 0.15 | 1.792 | 47.2 |
| | | r17'=+ 2.78 | d17' | = 0.74 | | |
| | L10' | r18'=− 4.96 | d18' | = 0.24 | 1.761 | 27.4 |
| | | r19'=− 2.98 | | | | |
| | L11' | | d19' | = 0.12 | 1.716 | 53.6 |
| | L12' | r20'=+ 2.42 | d20' | = 0.55 | 1.723 | 29.3 |
| | | r21'=+ 24.08 | d21' | = variable | | |
| 3' | L13' | r22'=− 2.95 | d22' | = 0.12 | 1.716 | 53.6 |
| | | r23'=+ 4.78 | d23' | = 0.24 | 1.727 | 29.0 |
| | L14' | r24'=− 34.79 | d24' | = variable | | |
| 4' | L15' | r25'=+ 26.00 | d25' | = 0.30 | 1.503 | 56.2 |
| | | r26'=− 4.89 | d26' | = 0.00 | | |
| | L16' | r27'=+ 10.88 | d27' | = 0.32 | 1.503 | 56.2 |
| | | r28'=− 6.57 | d28' | = 0.15 | | |
| | L17' | r29'=+ 2.92 | d29' | = 0.66 | 1.499 | 66.8 |
| | | r30'=− 4.21 | | | | |
| | L18' | r31'=− 69.22 | d30' | = 0.12 | 1.761 | 27.4 |
| | | | d31' | = variable | | |
| 5' | L19' | r32'=− 123.83 | d32' | = 0.61 | 1.761 | 27.4 |
| | | r33'=− 1.93 | | | | |
| | L20' | | d33' | = 0.09 | 1.734 | 28.5 |
| | | r34'=+ 4.67 | d34' | = variable | | |
| 6' | l21' | r35'=+ 9.29 | d35' | = 0.41 | 1.761 | 27.4 |
| | | r36'=− 2.59 | | | | |
| | L22' | | d36' | = 0.12 | 1.792 | 47.2 |
| | | r37'=+ 4.55 | d37' | = 0.27 | | |
| | L23' | r38'=− 9.17 | d38' | = 0.12 | 1.792 | 47.2 |
| | | r39'=+ 5.88 | d39' | = variable | | |
| 7' | L24' | r40'=+ 15.38 | d40' | = 0.49 | 1.489 | 70.2 |
| | | r41'=− 4.86 | d41' | = 0.00 | | |
| | L25' | r42'=+ 6.06 | d42' | = 0.37 | 1.585 | 46.2 |
| | | 43'=+ 46.74 | d43' | = 0.00 | | |
| | L26' | r44'=+ 3.69 | d44' | = 0.50 | 1.489 | 70.2 |
| | | 45'=− 75.23 | d45' | = 0.68 | | |
| | L27' | r46'=+ 24.82 | d46' | = 0.18 | 1.792 | 47.2 |
| | | r47'=+ 3.31 | d47' | = 0.43 | | |
| | L28' | r48'=+ 75.23 | d48' | = 0.15 | 1.761 | 27.4 |
| | | r49'=+ 2.42 | | | | |
| | 29'[ | d49' | = 0.68 | 1.503 | 56.2 | |
| | | r50'=− 4.96 | d50' | = 0.00 | | |
| | L30' | r51'=+ 2.61 | d51' | = 0.46 | 1.574 | 57.3 |
| | | r52'=+ 21.17 | | | | |

5. A varifocal objective as defined in claim 1 wherein said first component consists of five lenses L1″ – L5″, said second component consists of four lenses L6″ – L9″, said third component consists of two lenses L10″, L11″, said fourth component consists of four lenses L12″ – L15″, said fifth component consists of two lenses L16″, L17″, said sixth component consists of three lenses L18″ – L20″, and said seventh component consists of six lenses L21″ – L26″; the relative numerical values of the radii r1″ – r45″ and of the thicknesses and separations d1″ – d41″ of said lenses L1″ – L26″, the magnitudes of their refractive indices $n_e$ and the magnitudes of their Abbe numers $v_e$ being substantially as given in the following Table:

TABLE III

| Lenses | | Radii | Thicknesses and separations | | $n_e$ | $v_e$ |
|---|---|---|---|---|---|---|
| 1″ | L1″ | r1″=+ 210.11 | d1″ | = 0.23 | 1.727 | 29.0 |
| | | r2″=+ 10.98 | d2″ | = 0.72 | | |
| | L2″ | r3″=− 15.37 | d3″ | = 0.23 | 1.761 | 27.4 |
| | | r4″=∞ | d4″ | = 0.22 | | |
| | L3″ | r5″=− 210.11 | d5″ | = 0.52 | 1.643 | 59.9 |
| | | r6″=− 9.64 | d6″ | = 0.00 | | |
| | L4″ | r7″=+ 19.04 | d7″ | = 0.48 | 1.643 | 59.9 |
| | | r8″=− 26.71 | d8″ | = 0.00 | | |
| | L5″ | r9″=+ 6.22 | d9″ | = 0.63 | 1.643 | 59.9 |
| | | r10″=+ 44.85 | d10″ | = variable | | |
| 2″ | L6″ | r11″=+ 8.88 | d11″ | = 0.14 | 1.792 | 47.2 |
| | | r12″=+ 2.73 | d12″ | = 0.69 | | |
| | L7″ | r13″=− 4.20 | d13″ | = 0.23 | 1.761 | 27.4 |
| | | r14″=− 2.63 | | | | |
| | L8″ | | d14″ | = 0.11 | 1.716 | 53.6 |
| | | r15″=+ 2.17 | | | | |
| | L9″ | r16″=+ 23.05 | d15″ | = 0.46 | 1.723 | 29.3 |
| | | r17″=− 2.90 | d16″ | = variable | | |
| 3″ | L10″ | | d17″ | = 0.11 | 1.716 | 53.6 |
| | | r18″=+ 4.56 | | | | |
| | L11″ | | d18″ | = 0.23 | 1.727 | 29.0 |
| | | r19″=− 20.49 | d19″ | = variable | | |
| 4″ | L12″ | r20″=+ 11.65 | d20″ | = 0.23 | 1.499 | 66.8 |
| | | r21″=− 5.37 | d21″ | = 0.00 | | |
| | | r22″=+ 9.23 | d22″ | = 0.23 | 1.499 | 66.8 |
| | L13″ | r23″=− 5.75 | d23″ | = 0.14 | | |
| | | r24″=+ 3.19 | d24″ | = 0.49 | 1.499 | 66.8 |
| | L14″ | r25″=− 2.90 | | | | |
| | L15″ | | d25″ | = 0.11 | 1.761 | 27.4 |
| | | r26″=− 8.51 | d26″ | = variable | | |
| 5″ | L16 | r27″=− 13.87 | d27″ | = 0.40 | 1.761 | 27.4 |
| | | r28″=− 1.51 | | | | |
| | L17″ | | d28″ | = 0.08 | 1.734 | 28.5 |
| | | r29″=+ 6.10 | d29″ | = variable | | |
| 6″ | L18″ | r30″=− 32.00 | d30″ | = 0.30 | 1.746 | 28.0 |
| | | r31″=− 1.69 | d31″ | = 0.11 | 1.792 | 47.2 |
| | L19″ | r32″=+ 16.67 | d32″ | = 0.26 | | |

TABLE III-Continued

| Lenses | Radii | Thicknesses and separations | | $n_e$ | $v_e$ |
|---|---|---|---|---|---|
| L20″ | r33″= − 6.69 | d33″ | = 0.11 | 1.792 | 47.2 |
|  | r34″= + 6.03 | d34″ | = variable | | |
| L21″ | r35″= + 9.47 | d35″ | = 0.34 | 1.694 | 31.0 |
|  | r36″= − 5.40 | d36″ | = 0.00 | | |
| L22″ | r37″= + 3.32 | d37″ | = 0.40 | 1.716 | 53.6 |
|  | r38″= + 15.23 | d38″ | = 0.58 | | |
| L23″ | r39″= + 11.40 | d39″ | = 0.17 | 1.761 | 27.4 |
|  | r40″= + 2.61 | d40″ | = 0.40 | | |
| L24″ | r41″= + 32.67 | d41″ | = 0.14 | 1.761 | 27.4 |
|  | r42″= + 2.25 | d42″ | = 0.63 | 1.489 | 70.2 |
| L25″ | r43″= − 4.71 | d43″ | = 0.00 | | |
|  | r44″= + 2.57 | d44″ | = 0.43 | 1.643 | 59.9 |
| L26″ | r45″= + 52.79 | | | | |

(7″ bracket spans L20″ through L26″)

6. A varifocal objective as defined in claim 1 wherein said first, fifth, third, seventh, sixth, fourth and second components are of successively smaller absolute focal lengths.

7. A varifocal objective as defined in claim 1 wherein said mechanism includes first shift means mechanically linked with said second and third components and second shift means independent of said first shift means mechanically linked with said fifth and sixth components.

8. A varifocal objective as defined in claim 7, wherein said optical system further includes an adjustable diaphragm on said axis coupled with said mechanism for maintaining a substantially constant relative aperture throughout said range.

9. A varifocal objective as defined in claim 8 wherein said diaphragm is positioned between said third and fifth components.

10. A varifocal objective as defined in claim 9 wherein said diaphragm is coupled with said second shift means for maintaining a predetermined opening during displacement of said second and third components and is entrainable by said second shift means to vary its opening in proportion to the overall focal length upon displacement of said fifth and sixth components.

11. A varifocal objective as defined in claim 2 wherein said third and fifth components are doublets.

* * * * *